United States Patent [19]

Buse

[11] Patent Number: 4,767,277
[45] Date of Patent: Aug. 30, 1988

[54] FIBER-FILLED POLYMER IMPELLER

[75] Inventor: Fredric W. Buse, Allentown, Pa.

[73] Assignee: Ingersoll-Rand Company, Woodcliff Lake, N.J.

[21] Appl. No.: 255,151

[22] Filed: Apr. 17, 1981

[51] Int. Cl.⁴ .................................................. F04D 29/20
[52] U.S. Cl. ............................ 416/241 A; 416/244 R
[58] Field of Search ................................. 415/214, 141;
416/244 R, 241 A, 241 B, 230, 185; 403/41,
383, 350

[56] References Cited

U.S. PATENT DOCUMENTS 3,434,369  3/1969  Runkle ............................ 403/350 X
3,477,794 11/1969  Abbott et al. ............ 416/241 A UX
3,510,229  5/1970  Smith ....................... 416/241 A UX
3,604,819  9/1971  Krahe ....................... 416/241 B UX
3,779,668 12/1973  Ekey .............................. 415/141 X
3,994,177 11/1976  Cappelle et al. ................ 403/383 X

FOREIGN PATENT DOCUMENTS 1528765  1/1970  Fed. Rep. of Germany ... 416/241 A

Primary Examiner—Abraham Hershkovitz
Assistant Examiner—Joseph M. Pitko
Attorney, Agent, or Firm—D. W. Tibbott

[57] ABSTRACT

A molded fiber-filled polymer impeller having a polygon molded hole with machined grooves at the apexes of the polygon and a process for forming such grooves.

12 Claims, 1 Drawing Sheet

FIBER-FILLED POLYMER IMPELLER

BACKGROUND OF THE INVENTION

1. Field of the invention

This invention pertains to a molded fiber-filled polymer impeller and more particularly to a molded, fiber-filled polymer impeller having a polygon molded hole. Said hole is for receiving a shaft and said hole has machined grooves at the apexes of the polygon.

2. Description of the prior art

Traditionally impellers for centrifugal pumps have been made of metals. It is desired to make impellers of more corrosion resistant materials which can withstand the stresses subjected to the impeller.

SUMMARY OF THE INVENTION

This invention relates to a molded fiber-filled polymer impeller having a polygon molded hole for receiving a shaft. The hole has machined grooves at the apexes of the polygon. The impeller is molded and the grooves are formed after the impeller has set.

DESCRIPTION OF THE PREFERRED EMBODIMENTS

Figure 1:
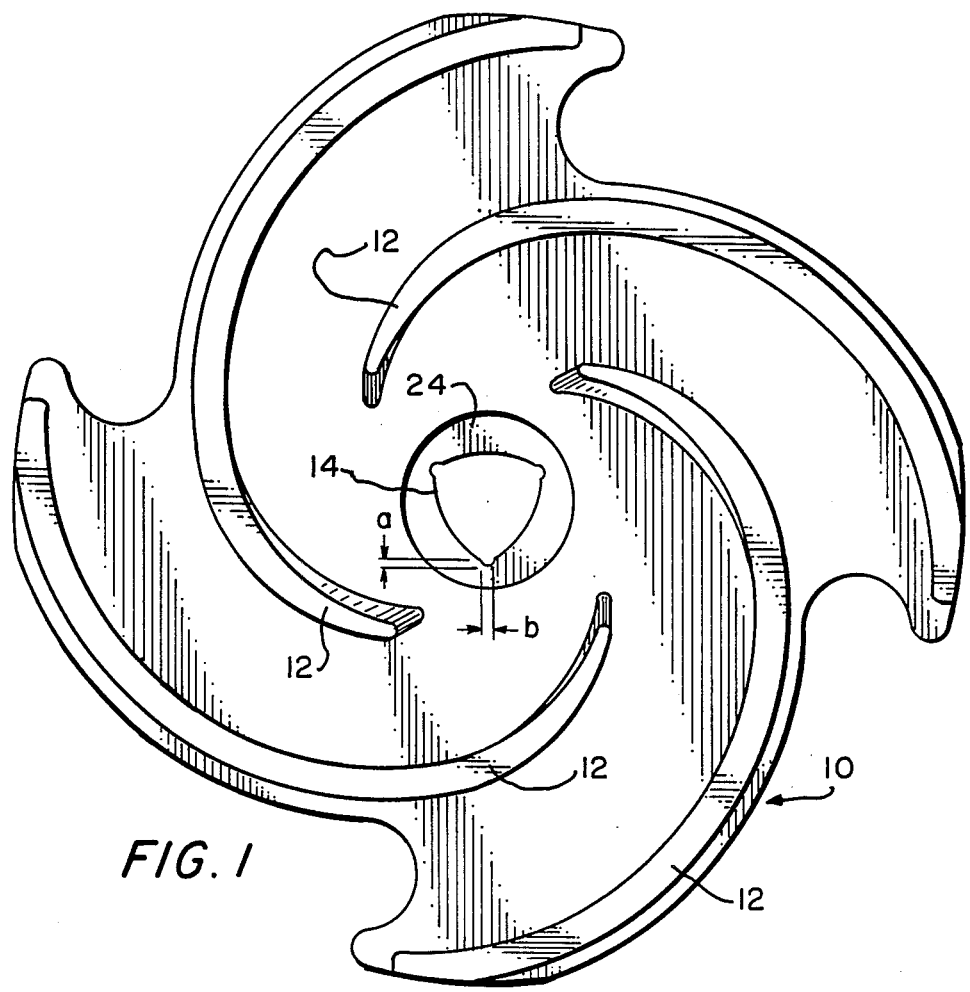
FIG. 1 is a side view of an impeller having a polygon molded hole with machined grooves at the apexes.
Figure 2:
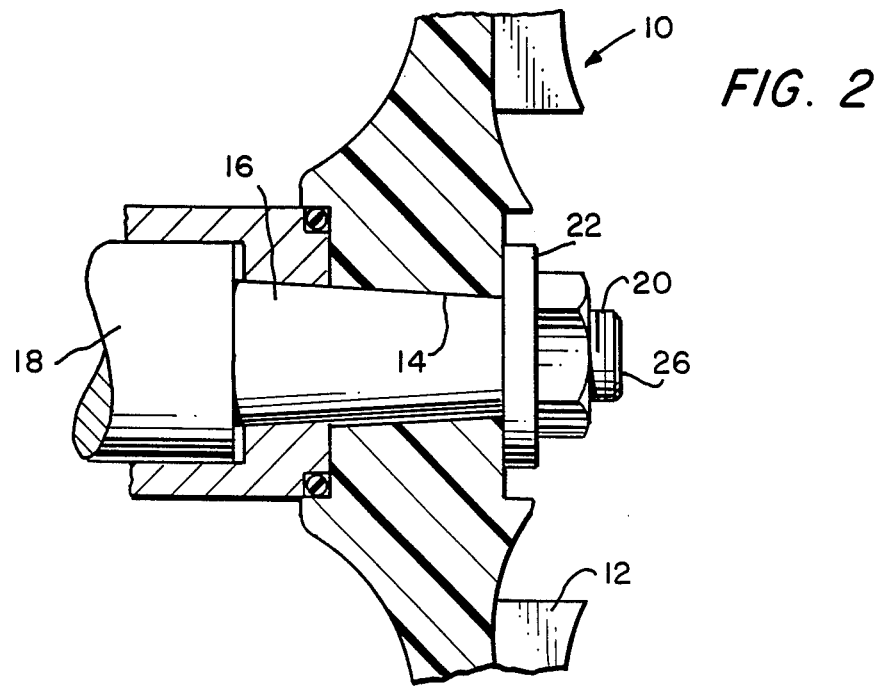
FIG. 2 is a cross-sectional view of said impeller showing a shaft protruding into said impeller and said impeller shaft being locked to the impeller.

Referring to FIG. 1 and 2 an impeller 10 is shown. Impeller 10 is constructed of a fiber-filled polymer. The fibrous and polymeric materials are suitably fiber glass and polyester respectively. The percent of fiber-fill is suitably from about 25 weight percent to about 50 weight percent.

Vanes 12 are part of impeller 10. Suitably there are three to ten vanes and preferably there are four vanes. A polygon hole 14 is molded in the center of impeller 12. The polygon hole may have straight sides or curved sides. If the polygon hole is straight sided, the polygon hole ranges from a three-sided polygon to a six-sided polygon. If the polygon hole is curved sided, the polygon hole ranges from a two-sided polygon to a six-sided polygon and preferably is a three-sided polygon. Polygon hole 14 may be tapered as shown in FIG. 2. A shaft 16 affixed to a rotational means 18 is inserted inside polygon hole 14 as shown in FIG. 2. The shaft may be removably affixed to impeller 10 by a locking means. The locking means includes a washer 22 and a nut 20 on thread 26 of shaft 16 as shown in FIG. 2.

According to the present invention, grooves 24 are machined into molded hole 14 after impeller 10 has been molded. Suitably the height "a" of groove 24 is about ¾ths of the width b of groove 24. Width "b" is suitably 3 mm (⅛ inch) and height "a" is suitably about 2.2 mm (3/32 inch).

It has been found that molded fiber-filled polymer impellers without the machined grooves 24 form cracks at the apexes. The apexes are susceptible to low stress failure and the cracks tend to propagate resulting in a loose impeller on the shaft. This may allow leakage of liquid onto the shaft which can result in shaft corrosion. In addition, each time an impeller without machined grooves is removed from the shaft and remounted the polygon hole changes shape. There is less fit between the impeller and shaft and this will result in a loose fit and excessive stress.

When notches 24 are employed according to the present invention, there is eliminated a stress concentration area and the loads are allowed to increase by 25 to 30%. It has also been found that these notches give the polygon hole memory to fit. The fit of the impeller to the shaft remains the same for each remount.

The impeller is prepared by molding a fiber-filled polymer impeller with a polygon molded hole. The impeller may be molded by placing a mixture which includes a fibrous material and a polymer precursor into a mold and curing the impeller as is well known to those skilled in the art. After the impeller has set, a groove is formed at the apexes of the hole. The impeller has set when the impeller is of sufficient viscosity or integrity to allow formation of the groove without flow or distortion of the impeller. The impeller may set prior to complete curing. Formation of the groove removes fiber deficient areas at the apexes. The groove is formed by conventional means such as machining which includes drilling, punching, milling and the like.

I claim:

1. An impeller prepared by molding a fiber-filled polymer impeller with a polygon hole having at least three sides, for receiving a shaft and forming grooves at the apexes of the polygon hole after the fiber-filled polymer impeller has set.

2. An impeller according to claim 1 wherein the sides of the polygon hole are curved.

3. An impeller according to claim 2 wherein the polygon hole is a three-sided hole.

4. An impeller according to claim 1 wherein the groove is formed by machining.

5. A molded fiber-filled polymer impeller having a polygon molded hole having at least three sides for receiving a shaft, said hole having machined grooves at the apexes of the polygon.

6. A molded fiber-filled polymer impeller according to claim 5 wherein the sides of the polygon hole are curved.

7. A molded fiber-filled polymer impeller according to claim 6 wherein the polygon hole is a three-sided hole.

8. A molded fiber-filled polymer impeller according to claim 6 wherein there are four vanes.

9. A molded fiber-filled polymer impeller according to claim 5 wherein the height of the machined groove is approximately 3/4ths of the width of the machined groove.

10. A molded fiber-filled polymer impeller according to claim 5 wherein the machined groove is approximately 3 mm wide.

11. A molded fiber-filled polymer impeller according to claim 5 wherein the machined groove is approximately 2.2 mm in height.

12. A molded fiber-filled polymer impeller according to claim 5 wherein the polygon molded hole is tapered.